UNITED STATES PATENT OFFICE.

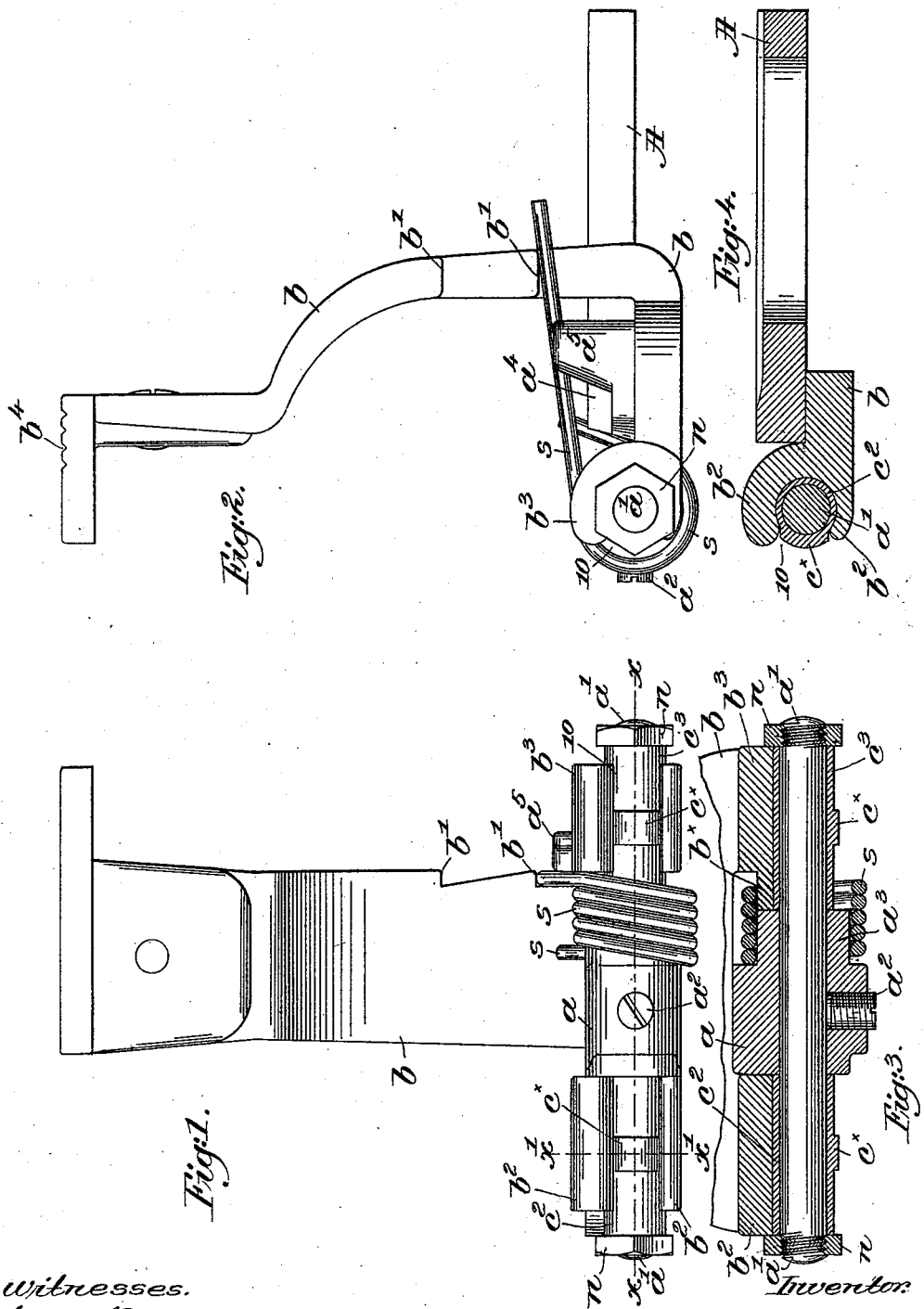

WALLACE I. STIMPSON, OF MILFORD, ASSIGNOR TO THE DUTCHER TEMPLE COMPANY, OF HOPEDALE, MASSACHUSETTS.

LOOM-TEMPLE.

SPECIFICATION forming part of Letters Patent No. 545,638, dated September 3, 1895.

Application filed May 20, 1895. Serial No. 549,915. (No model.)

*To all whom it may concern:*

Be it known that I, WALLACE I. STIMPSON, of Milford, county of Worcester, State of Massachusetts, have invented an Improvement in Loom-Temples, of which the following description, in connection with the accompanying drawings, is a specification, like letters and figures on the drawings representing like parts.

This invention relates to that class of loom-temples wherein the temple-shank is hinged or journaled to the temple-stand, and has for its object the production of means whereby the wear of the journal may be compensated for from time to time in a convenient and effective manner without necessitating the substitution of a new journal.

In accordance therewith my invention consists in a loom-temple constructed and arranged as will be hereinafter described in the specification, and particularly pointed out in the claims.

Figure 1 is an inner side view in elevation of a loom-temple embodying my invention, the pod and cap being omitted. Fig. 2 is a right-hand end view of the temple shown in Fig. 1. Fig. 3 is a horizontal sectional view on the line $x\ x$, Fig. 1, of the joint or hinge connecting the temple-shank and stand; and Fig. 4 is a transverse sectional view thereof, taken on the line $x'\ x'$, Fig. 1.

Referring to the drawings, A is a foot-plate adapted to be adjustably secured in usual manner to a foot-plate (not shown) and constituting therewith a stand. The foot-plate A has an ear $a$, provided with a hole for the reception of a bearing stud or pin $a'$, which is held fixedly in place by a suitable set-screw $a^2$, and the said ear has a laterally-extended reduced portion $a^3$ for a purpose to be described. The foot-plate has a second ear $a^4$, one edge of which receives against it one end of the actuating-spring $s$, the opposite end of the spring acting against one of a series of shoulders $b'$ of the temple-shank $b$, a lug or projection $a^5$ on the top of the foot-plate preventing accidental displacement of the spring acting on the temple-shank. At its lower end the shank $b$ has two sleeve-like hubs or ears $b^2\ b^3$, longitudinally slotted or cut away at 10 from one to the other ends, said hubs or ears receiving therein removable cylindrical sleeves or bushings $c^2\ c^3$, of Babbitt or other suitable bearing material, surrounding the projecting ends of the pin or stud $a'$ at each side of the ear $a$, so that the shank $b$ may turn thereon as a pivot with the minimum of friction and wear. Each bushing is provided externally with a lug or projection $c^\times$ to enter the slots 10 of the hubs $b^2\ b^3$, as clearly shown in Figs. 1 and 4, the bushings being retained in the said hubs by retaining-nuts $n$, screwed onto the threaded ends of the pin or stud $a'$. One of the hubs, as $b^3$, Fig. 3, is reduced at its inner end, at $b^\times$, adjacent the part $a^3$ of the ear $a$, to form a seat for the coiled portion of the spring $s$.

In putting the temple together the ears $b^2$, $a$, and $b^3$ will be brought into line and the pin or stud $a'$ will be driven into the ear $a$ and held therein by the set-screw $a^2$. By providing the two hubs or ears on the shank to embrace the pin $a'$ at each side of the support for the latter the twisting strain on the shank is reduced and the efficiency of the temple is increased.

The bushings or bearings $c^2\ c^3$ are subjected to considerable wear, and when too much worn to operate properly they can be removed from the hubs $b^2\ b^3$ and new ones inserted by simply removing the retaining-nuts $n$ on the pivot-stud $a'$, the lugs $c^\times$ affording means by which they may be struck by a hammer or otherwise to drive them out of the hubs, the slots 10 permitting access to the bearings. By this construction I am enabled to renew the bearings when necessary without removing the pivot-stud $a'$ or disconnecting the parts of the temple. The upper end of the shank $b$ is shown as serrated in usual manner at $b^4$ to co-operate with like serrations at the under side of the projecting part of the pod. (Not shown.)

My invention is not limited to the exact shape of the stand and shank, nor to the exact construction of the removable bearings or their supporting-hubs.

I claim—

1. In a loom temple, a temple stand having an ear, and a fixed pivot pin extended from each side of said ear, combined with a shank having two longitudinally slotted hubs mounted on said pin, and a removable bearing in each hub surrounding the pin, access to the bearing to remove it being had through the slot in the hub, substantially as described.

2. In a loom temple, a temple stand having an ear, and a fixed pivot pin extended from each side of said ear, combined with a shank having two longitudinally slotted hubs mounted on said pin, a removable bearing or bushing in each hub, to which access may be had through the slots in the hubs, to remove the bearings, and retaining nuts therefor on the ends of the pivot pin, substantially as described.

3. In a loom temple, a temple stand having an ear, and a fixed pivot pin extended from each side of said ear, combined with a shank having two longitudinally slotted hubs mounted on said pin, and a removable bearing in each hub provided with an external lug to enter the longitudinal slot in the hub, substantially as described.

In witness whereof I have signed my name to this specification in the presence of two subscribing witnesses.

WALLACE I. STIMPSON.

Witnesses:
FRANK J. DUTCHER,
GEO. E. STIMPSON.